United States Patent
Simpson

(10) Patent No.: US 9,910,561 B2
(45) Date of Patent: *Mar. 6, 2018

(54) HIGHLY EFFICIENT AND PARALLEL DATA TRANSFER AND DISPLAY WITH GEOSPATIAL ALERTING

(71) Applicant: Vection Technologies Inc., Sherman Oaks, CA (US)

(72) Inventor: Bradley Craig Simpson, Sherman Oaks, CA (US)

(73) Assignee: Vection Technologies Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,990

(22) Filed: May 9, 2017

(65) Prior Publication Data
US 2017/0300196 A1    Oct. 19, 2017

Related U.S. Application Data

(63) Continuation-in-part of application No. 14/324,012, filed on Jul. 3, 2014, now Pat. No. 9,665,267.

(60) Provisional application No. 61/920,348, filed on Dec. 23, 2013.

(51) Int. Cl.
*G06F 15/16* (2006.01)
*G06F 3/0482* (2013.01)
*G06F 3/0485* (2013.01)
*G06F 3/0486* (2013.01)
*G06F 3/0488* (2013.01)
*H04L 29/08* (2006.01)
*H04L 29/06* (2006.01)

(52) U.S. Cl.
CPC .......... *G06F 3/0482* (2013.01); *G06F 3/0485* (2013.01); *G06F 3/0486* (2013.01); *G06F 3/0488* (2013.01); *G06F 3/04883* (2013.01); *H04L 67/02* (2013.01); *H04L 67/06* (2013.01); *H04L 69/04* (2013.01)

(58) Field of Classification Search
USPC ....... 709/203, 206, 217, 219, 223, 224, 226, 709/228, 231, 232, 238; 715/765, 776; 345/158, 173, 633; 379/88.02
See application file for complete search history.

(56) References Cited

U.S. PATENT DOCUMENTS

| | | |
|---|---|---|
| 5,937,419 A | 8/1999 | Oshiro et al. |
| 8,990,418 B1 | 3/2015 | Bragg et al. |
| 2007/0174209 A1 | 7/2007 | Fallon et al. |
| 2009/0262074 A1* | 10/2009 | Nasiri ............... A63F 13/06 345/158 |

(Continued)

*Primary Examiner* — Quang N Nguyen
(74) *Attorney, Agent, or Firm* — Sheppard Mullin Richter & Hampton LLP

(57) ABSTRACT

A method for highly efficient and parallel data transfer and display with event alerting includes employing an aggregation server to receive and filter multiple Internet data feeds, including an event list, streaming each Internet data feed to an input device as a streamed data segment, displaying each data segment in an interactive stacked ticker display on the remote computing device, determining a location of the input device, displaying an event alert in the interactive stacked ticker display if the input device location comes within a threshold distance of an event location, and enabling a user to purchase tickets to the event corresponding to the event alert.

16 Claims, 16 Drawing Sheets

(56) References Cited

U.S. PATENT DOCUMENTS

| | | | |
|---|---|---|---|
| 2010/0131659 A1* | 5/2010 | Narayana | H04L 65/1083 |
| | | | 709/228 |
| 2011/0148789 A1* | 6/2011 | Kim | G03B 17/54 |
| | | | 345/173 |
| 2011/0289108 A1 | 11/2011 | Bhandari et al. | |
| 2012/0240074 A1* | 9/2012 | Migos | G06F 3/0483 |
| | | | 715/776 |
| 2013/0077772 A1* | 3/2013 | Lichorowic | H04M 1/271 |
| | | | 379/88.02 |
| 2013/0185554 A1 | 7/2013 | Hartmann et al. | |
| 2013/0332603 A1* | 12/2013 | Hutten | H04L 41/50 |
| | | | 709/224 |
| 2014/0089829 A1* | 3/2014 | Han | G06F 3/0482 |
| | | | 715/765 |
| 2014/0092135 A1* | 4/2014 | McArdle | G06F 3/04815 |
| | | | 345/633 |
| 2014/0207860 A1 | 7/2014 | Wang et al. | |
| 2015/0180944 A1* | 6/2015 | Simpson | H04L 69/04 |
| | | | 709/203 |

* cited by examiner

HIGHLY EFFICIENT AND PARALLEL DATA TRANSFER AND DISPLAY WITH GEOSPATIAL ALERTING

CROSS-REFERENCE TO RELATED APPLICATION

This application is a continuation-in-part of U.S. Pat. No. 9,665,267, filed on Jul. 3, 2014, which claims priority to Provisional Application No. 61/920,348, which was filed on Dec. 23, 2013, the contents of each of which are hereby incorporated herein by reference in their entirety.

TECHNICAL FIELD

The disclosed technology relates generally to Internet data aggregation, and more particularly, some embodiments relate to methods or systems for highly efficient and parallel data transfer and display.

BACKGROUND

The amount of Internet content available to users has grown exponentially over the last decade, as has the number of Internet content viewers available to users. This dramatic increase has been driven by increases in popularity of social media repositories and users, and the general acceptance of the Internet as a viable alternative information delivery facility. However, the increase in Internet content also creates data monitoring challenges for users. In particular, parsing through the large pool of data for information that is relevant, interesting, and/or necessary to deliver to a particular user has become impractical.

For the purposes of this disclosure, Internet content may include social media, news, advertising, or other Internet content sources as would be generally known in the art. Most content viewing tools and applications display a static snapshot of a singular Internet content source to a user, and enable the user to selectively, but manually, interact with the static snapshot to view detailed information on a particular topic. These viewers tend to only update displayed data over preset intervals. These viewers are also inefficient because they generally require parallax scrolling to navigate through data within each data feed. Some viewers do enable compilation of multiple data feeds into a single view, but still only provide static snapshots of content and require manual interaction from a user to view detailed stories. Alternatively, some viewers do enable a ticker style display of data, but only display data from singular sources and only update data within the feed on preset intervals. None of these available viewers, nor their underlying data transfer protocols, are capable of streaming live data feeds from multiple Internet data sources to a singular application residing on a wireless mobile device and displaying those data feeds in an organized and understandable fashion. Accordingly, none of the currently available technologies solve the problem of efficiently parsing the multitude of Internet data sources and delivering multiple parallel data streams to a mobile device display in real time.

BRIEF SUMMARY OF EMBODIMENTS

According to various embodiments of the disclosed technology, a method for highly efficient and parallel data transfer and display with event alerts enables compiling of multiple data streams from multiple Internet data sources onto a central server, parsing each individual data stream to extract relevant data chunks consistent with predefined user preferences, compressing the data chunks, asynchronously streaming the compressed data chunks over a wireless network to a mobile device, and decompressing the data chunks into data streams on the mobile device. For example, the central server may be a cloud-based server, a remote server, or a local server. The asynchronous streaming of data chunks may be performed using one or more a Application Program Interfaces (APIs). Some embodiments of the disclosure include displaying each individual data stream in a moving ticker display with data updating in real time. In some embodiments, one or more Internet data sources includes an event list, wherein the event list includes a plurality of events and a plurality of corresponding event locations.

The central server may also receive a location signal from the mobile device indicating the mobile device's location. If the mobile device's location comes within a threshold distance of an event location, the central server may generate and push an event alert to the mobile device for interactive display in the moving ticker display. The event alert may also include an indication from a ticketing system as to whether tickets are available for purchase to the event. The user may then interact with the event alert ticker display to purchase tickets to the event.

Some examples include accepting user input, wherein the input may include rewind commands, pause commands, fast forward commands, or open detail commands, such that a user may interact with each individual ticker display. If rewind is selected, the mobile device may request previously transferred data streams from the central server, causing the central server to re-transmit the compressed data streams, and causing the mobile device to decompress the data streams and display them in the ticker. If fast forward is selected, the mobile device may request data streams that have yet to be transferred, causing the central server to compress new data chunks into data streams and transfer the data streams to the mobile device, and causing the mobile device to decompress the data streams and display the data in a ticker display. The stacked ticker interface enables efficient navigation through multiple data sources, as compared with legacy parallax scrolling methods. If pause is selected, the ticker display may freeze the data display into a static representation of the data stream state that existed at the time the pause was selected. If open detail is selected, a full Internet data feed to the particular related data stream will display in a viewer window (e.g. a web page from the original Internet web page may display inside a viewer window).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
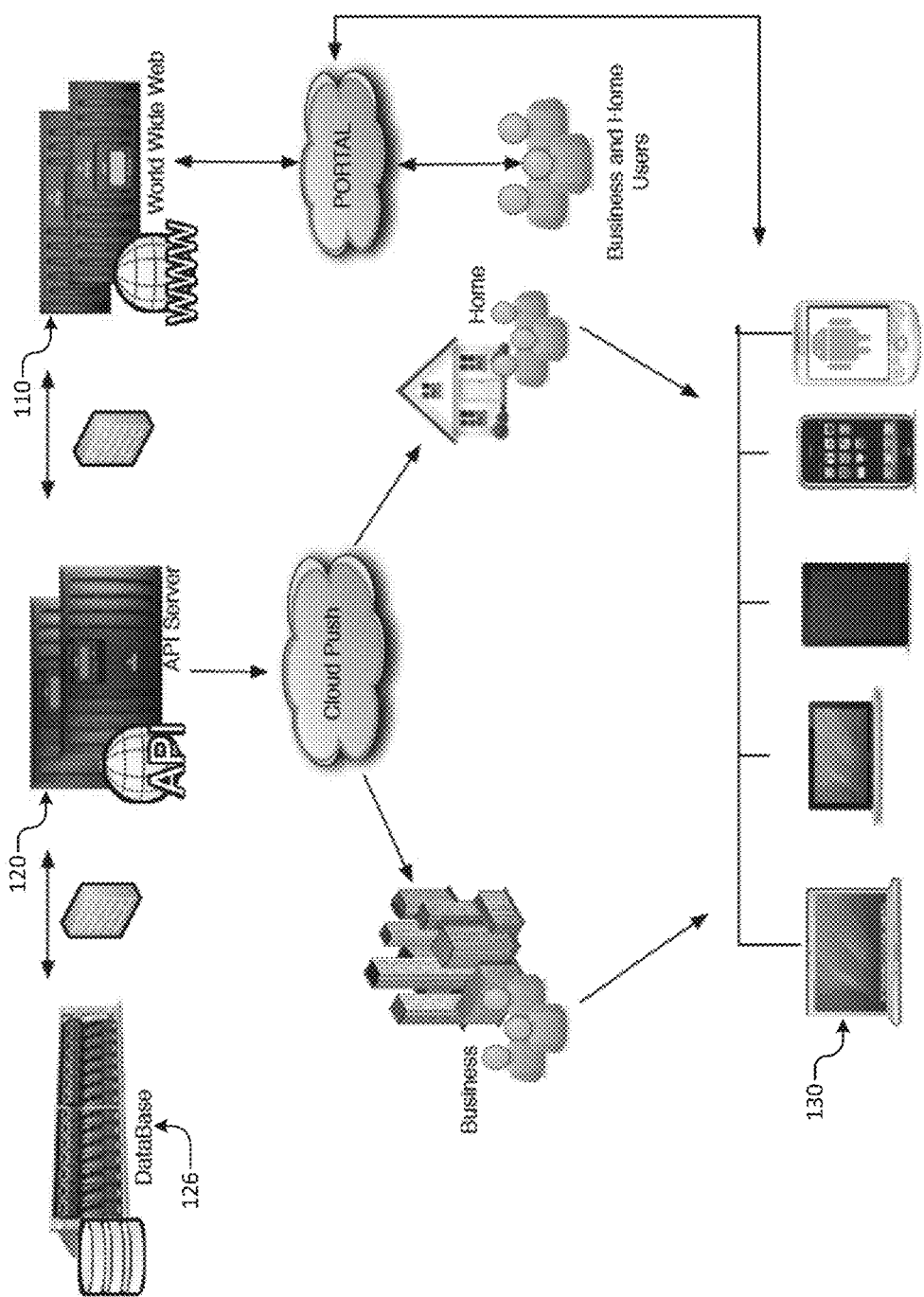
FIG. 1 illustrates a system for highly efficient parallel data transfer in accordance with embodiments of the technology described herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The technology disclosed herein is directed toward a system and method for highly efficient and parallel data transfer and display. In one embodiment, a method for highly efficient and parallel data transfer and display includes using a computer processor and a non-transitory memory with computer executable instructions embedded thereon, the computer executable instructions being configured to perform the steps of: receiving a plurality of Internet data feeds; receiving a plurality of user preferences; parsing the Internet data feeds according to user preferences; applying a streaming compression algorithm to each Internet data feed to form a data stream; and transmitting one or more of the data streams to a mobile device.

In some examples of the method, the Internet data feeds include data feeds from news media websites, social media websites, marketing and advertising websites or servers, and/or other data store or Internet based website. The receiving of the data feeds may be accomplished using Rich Site Summary (RSS), Simple Mail Transfer Protocol (SMTP), Hypertext Markup Language (HTTP), File Transfer Protocol (FTP), Extensible Markup Language (XML), or other Transmission Control Protocol (TCP) or User Datagram Protocol (UDP) data transmission protocols as known in the art.

In some examples of the method, the transmitting of the data streams to a mobile device is performed using Real-Time Transport Protocol (RTP), Secure Real-Time Transport Protocol (SRTP), Real-Time Control Protocol (RTCP), Secure Real-Time Control Protocol (SRTCP), Real-Time Streaming Protocol (RTSP), or other asynchronous data streaming protocols as known in the art.

In another embodiment, a system for highly efficient and parallel data transfer and display includes an Internet data stream consolidation system and a remote processing system. In some embodiments, an Internet data feed consolidation system may include a server, a compression engine module, a data store module, and/or a streaming engine module wherein the server may be configured to receive and process a plurality of Internet data feeds, and further configured to receive and process user preferences. The compression engine module may be configured to receive parsed data from the server, compress the data, and send the data back to the server and/or to the data store module. The data store module may be configured to receive and store data from either the server or compression engine module. The streaming engine module may be configured to receive parsed and/or compressed data feeds from the server, compression engine, and/or servers and convert the data to data streams, and further configured to transfer the data to the remote data processing system.

In some embodiments, the remote data processing system may be a mobile device such as a mobile/smart phone device, a tablet PC, a laptop, or other mobile devices known in the art. In some examples, a smart TV, arena screen, or other multimedia device may be used instead of or in addition to a mobile device. The device may include a user interface module, a cache module, a display controller module, and/or a decompression engine module wherein the cache module may receive one or more data streams from the data feed consolidation system and the decompression engine module may receive each data stream from the cache module, decompress the data stream into a live data feed, and send the live data feed to the display controller. The display controller may then display each live data feed in an independent interactive ticker tape display such that a user may pause the ticker, rewind the ticker, fast forward the ticker, or select the ticker to open a detail display from the original Internet data source related to the ticker. The display controller may display one or more tickers on a single graphical user interface.

FIG. 1 illustrates an example system for highly efficient parallel data transfer. In one embodiment, a system for highly efficient parallel data transfer includes an Application Programming Interface (API) server 120, a database 126, and a mobile device 130. API server 120 receives a plurality of Internet data feeds from multiple Internet data sources 110. API server 120 may store complete or partial data feeds in database 126, retrieve user preferences from database 126, parse the plurality of data feeds according to user preferences, and compress each parsed data feed into a data stream. The API server may also push one or more data streams through a cloud network to individual mobile devices 130 according to user preferences. Each mobile device 130 may be a laptop, tablet PC, smart phone, or other mobile device as known in the art. In some embodiments, a data feed may include advertisement data, and a ticker, or portions of a ticker may be dedicated to displaying advertisements, for example, as a revenue generating medium for the owner of a particular data feed. Some tickers may include interactive components installed as an "app" integrated into the stacked ticker interface.

In some examples, ticker data feeds or apps may be identified using a mobile camera or optical sensor interface. For example, the mobile camera or optical sensor may receive information from a barcode, a QR code, an image, a ticker running across a television or computer screen, or other computer readable pattern (e.g., an image flashed on all or part of a television screen or computer monitor during a television broadcast, commercial, or while viewing a website or email). The optical sensor may receive and interpret the information by accessing a ticker indexing database (e.g., an index of available ticker data feeds and apps), and may request a particular ticker data feed or app that matches the information represented by the image, barcode, QR code, or other computer readable pattern, for installation on the mobile device. In some embodiments, ticker data feeds or apps may be identified from encoded content embedded in a text message, email, picture, or other communication sent from another device. The encoded content may be decoded and used to identify a ticker data feed or app by accessing the ticker indexing database. In this manner, ticker data fees and/or apps may be identified for installation by stacked ticker interface users by third parties (e.g., by displaying tickers or encoded information identifying tickers in advertisements, in television programming, on websites, or other media), or from a user's friend who may share the ticker data feed or app directly with the user.

In some embodiments, the stacked ticker interface may be preinstalled on a mobile device and used as an operating system. Each ticker may run a different application, wherein some applications may be interactive and control basic input/output functions of the device (e.g., enabling operation of a telephone transceiver, camera, text, or other fundamental operation. Applications may also include tickers for displaying web-based information, email, or other interactive data feeds. In this way, the stacked ticker interface may enable feature phones to operate as pseudo smart-phones without full smart-phone functionality. The light-weight capability of the interactive ticker data feed may also enable smart phones to operate multiple functions within the stacked ticker interface with limited resource utilization, thus preserving battery life. Because the data feeds may be compressed, wireless data utilization may also be minimized, which may be a benefit for users in developing countries, airplanes, or other locations where data bandwidth is limited and/or expensive.

Figure 2:
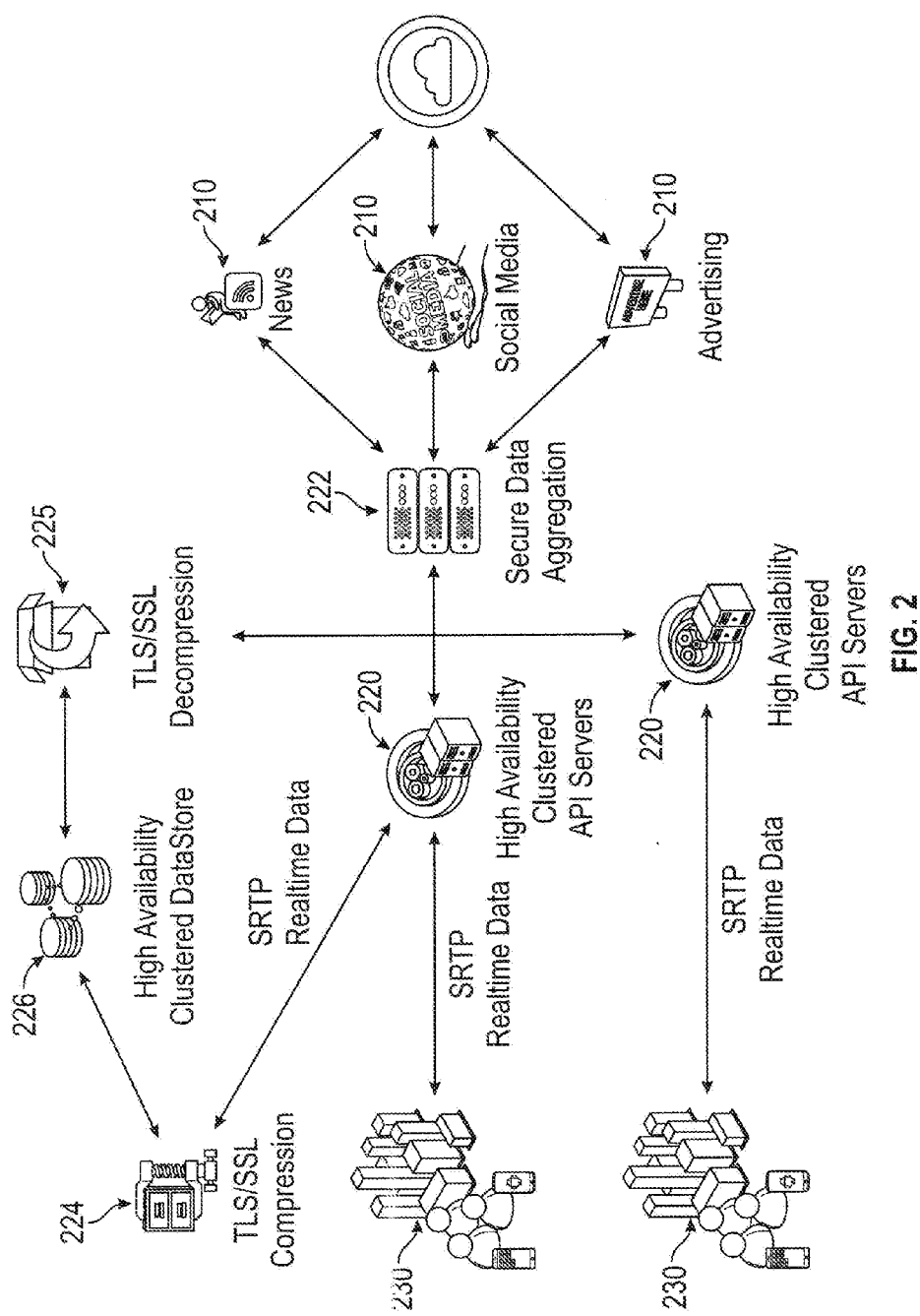
FIG. 2 illustrates a system for compressing and decompressing data streams in accordance with embodiments of the technology described herein.

FIG. 2 illustrates an example system for compressing and decompressing data streams. Referring to FIG. 2, a secure data aggregation server 222 may aggregate plurality of Internet data feeds 210 and forward them to API server 220. API server 220 may then compress the data using compression module 224 and store the data in data store 226. Data feeds may be transferred between each of the described modules using data streaming protocols such as SRTP, for example. Compression module 224 may use Transport Layer Security (TLS) or Secure Socket Layer (SSL) compression, or may be use other compression techniques as disclosed herein, and/or as would be known in the art. In some embodiments, a decompression module 225 may also receive compressed data streams from the data store 226 and decompress them into streaming data content. In other embodiments, compressed data streams are sent to mobile devices 230 and decompressed therein. Data feeds and data streams may each be streamed to mobile device 230 using SRTP streaming protocol. Data feeds and data streams may also be streamed from API server 220 to mobile device 230 using RTP, RTCP, SRTCP, RTSP, or other data streaming protocols known in the art.

Figure 3A:
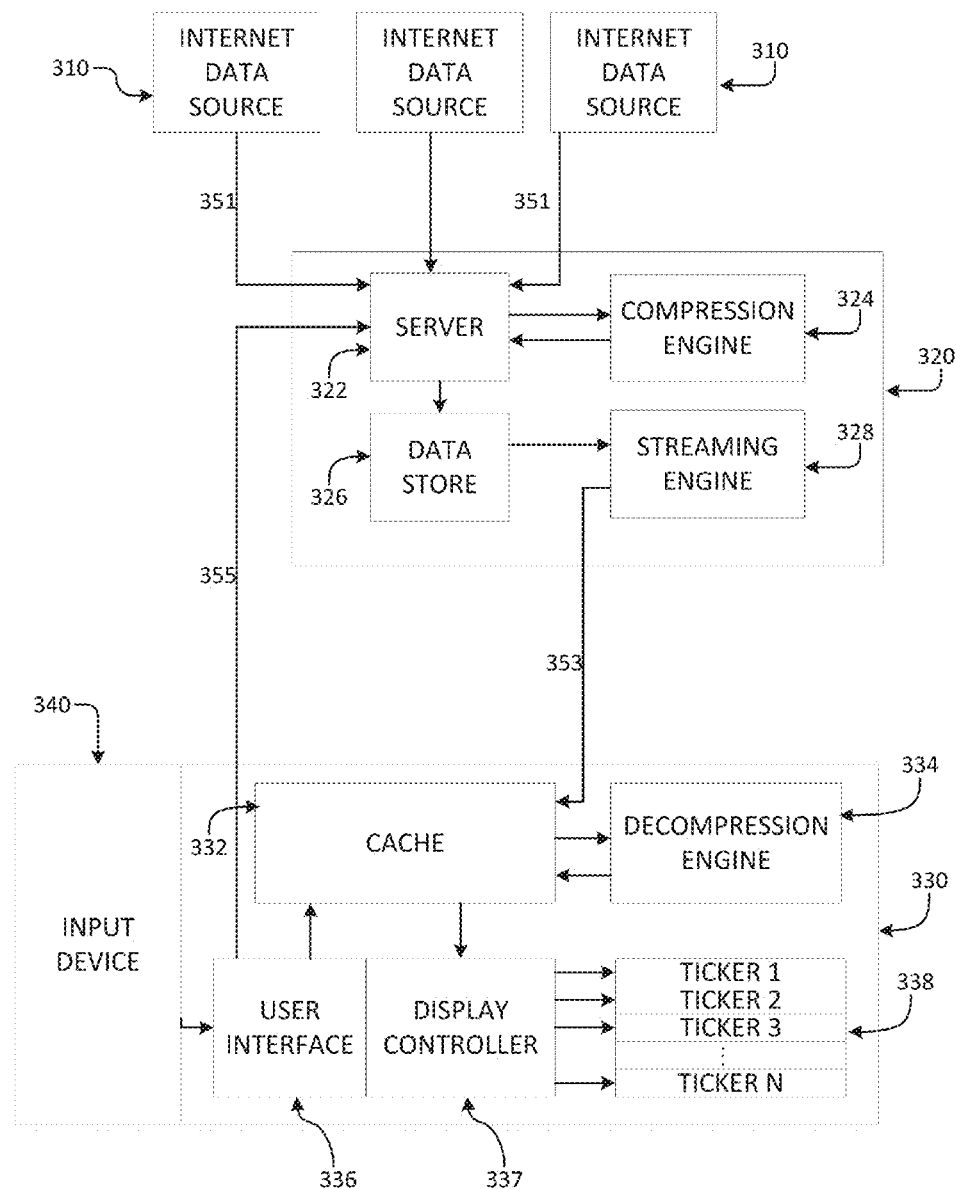
FIG. 3A illustrates a system for highly efficient parallel data transfer in accordance with embodiments of the technology described herein.

FIG. 3A illustrates an example system for highly efficient parallel data transfer. Referring to FIG. 3, data aggregation system 320 electronically couples to Internet data sources 310, and also electronically couples to remote data processing module 330. Data aggregation system 320 may include a server 322, a compression engine module 324, a data store module 326, and a streaming engine module 328. In some embodiments, server 322 may receive user configuration data 355 from a user interface module 336, and may receive data feeds 351 from Internet data sources 310.

Still referring to FIG. 3A, server 322 may interface with compression engine module 324, data store module 326, and streaming engine module 328, such that server 322 parses data feeds 351 and sends the parsed data feed to compression engine module 324. Server 322 may parse the data feed by, for example, filtering the data content based on the content source, content meta data, text filter criteria, temporal currency, and/or other filtering criteria known in the art. For example, in some embodiments, the server 322 may determine a preselected subset of available Internet data sources 310 based on user selections, and may sub-filter data from particular sub-set of social media websites by filtering for pre-determined or dynamically determined hash tags. Dynamic filtering criteria may be determined through trend analysis (e.g. determining the most popular hash tags over the last 24 hours) performed by the server 322, or imported from external systems.

Still referring to FIG. 3A, compression engine module 324 may compress parsed data from server 322 in real time and store compressed data in data store module 326. Data compression may be accomplished using lossy or lossless compression algorithms disclosed herein to optimize particular parsed data sets for streaming over wireless networks. Streaming engine module 328 may then pull compressed data stream data from data store module 326, or directly from compression engine module 324, and transmit data over data streaming protocol 353 to remote data processing module 330. Data transmission may be facilitated over wired networks using TCP/IP and/or HTTP protocols, for example, and may additionally be transmitted over 3G, 4G, or other known wireless network protocols.

Still referring to FIG. 3A, remote data processing module 330 may include cache module 332, decompression engine module 334, user interface module 336, and display controller module 337. Remote data processing module 330 further includes an input device 340. For example, input device 340 may be a touch screen display, a voice recognition device, motion sensing device such as a hand held wand with accelerometers contained therein, or other electronic input devices as known in the art. Remote data processing module 330 may be a smart phone, a tablet computer, a personal computer, a smart television, a big screen or oversized display, a car's dashboard display, or other computing device coupled with a display and input device as known in the art.

User interface module 336 may be configured to accept various user input from input device 340, such as configuration settings, and/or live interaction with data streams (e.g. user input commands to rewind data streams, fast forward data streams, pause data streams, or open detailed displays of data from the original Internet data source related to a particular data stream). Decompression engine module 334, user interface module 336, and display controller module 337 may generally interface with cache module 332 through a standard mobile device operating system (e.g. iOS, OSX, Android, Windows, or other known operating systems). Decompression engine module 334 may receive and decompress real-time data streams from data aggregation system 320, and may push the compressed data streams to display controller module 337. Display controller module 337 may process decompressed data streams into a real-time crawling ticker 338, displaying an individual ticker for each individual data feed in parallel. Individual tickers may be independently manipulated by user input through user interface module 336, as disclosed herein, through standard user input through input device 340 (e.g. by using swipe gestures on a mobile device touch screen display, by inputting a voice command to a voice recognition system, or by sensing movement of a motion sensing wand device).

Figure 3B:
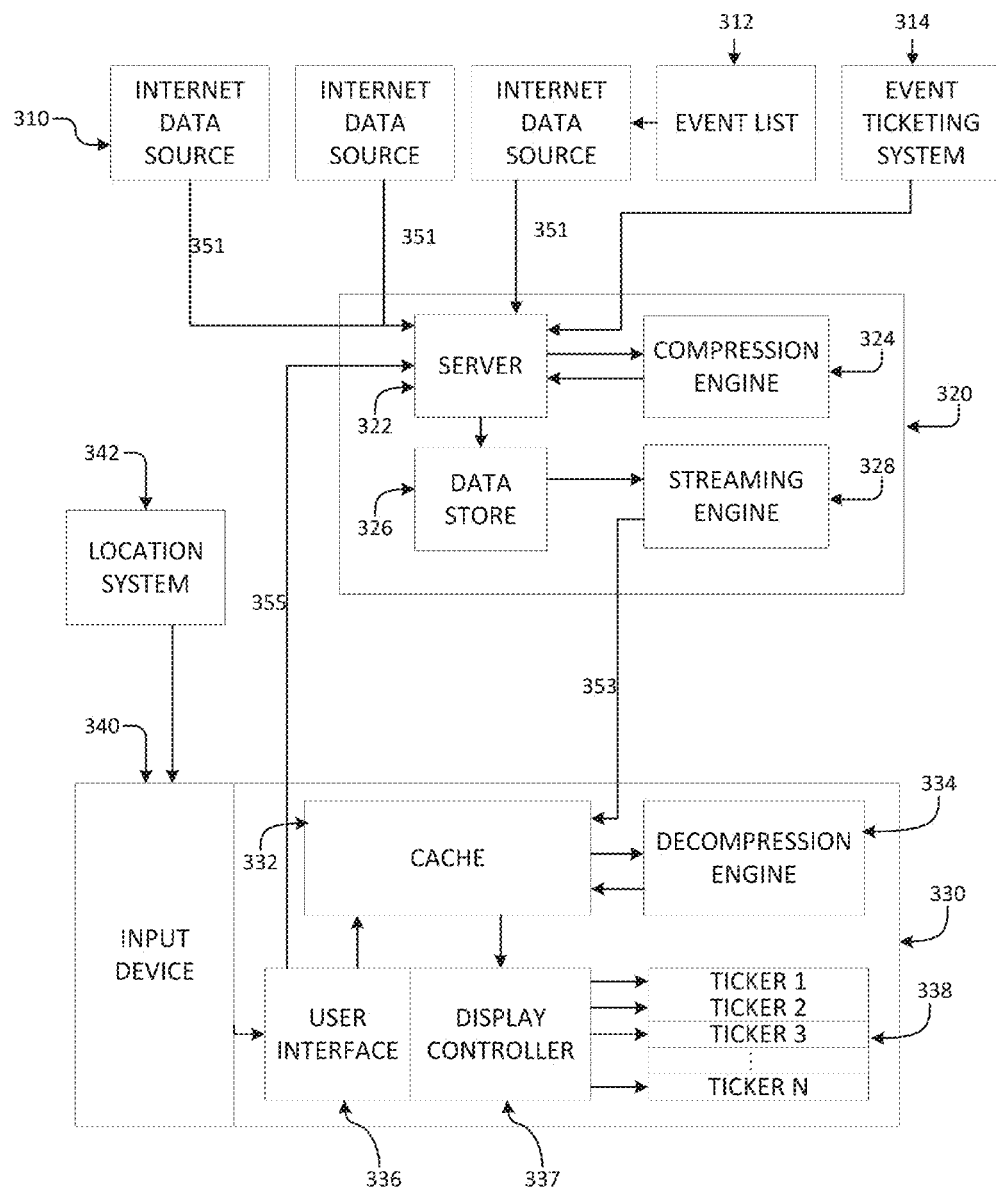
FIG. 3B illustrates a system for highly efficient parallel data transfer and event alerting in accordance with embodiments of the technology described herein.

FIG. 3B illustrates a system for highly efficient parallel data transfer and event alerting. In some embodiments, a system for highly efficient parallel data transfer, as described with respect to FIG. 3A, may also be configured to provide event alerting. For example, one or more of the Internet data sources 310 may include an event list 312. The event list may include one or more physical events. In some embodiments, the events list may be configured to include physical events that conform with a set of user preferences. The event list 312 may include physical events such as baseball games, basketball games, football games, hockey games, tennis matches, golf tournaments, music concerts, theatric performances, movies, swap meets, fairs, grand openings or special sales for stores or restaurants, amusement parks, or other sports or entertainment events as known in the arts. The events may be one-time events, part of a series of events like a baseball season with multiple games, or perpetual events, such as an amusement parks. The event list may be compiled from one or more sources, including Internet sources belonging to a particular sports league or theater, a ticket consolidation service such as STUBHUB or TICKETMASTER, event venues, or other event information sources as known in the art. The event list may also include a physical location corresponding to each event. Information about one or more events, including the physical location of the event, may be pushed to server 322. Server 322 may include one or more APIs configured to receive event information from one or more Internet data sources 310, or from an event ticketing system 314. For example, event ticketing system 314 may be a ticketing system such as STUBHUB, TICKETMASTER, FANDANGO, or other ticketing systems as known in the art. In some embodiments, the event list may be filtered according to user preferences, similar to filtering of other Internet data sources 310.

In some embodiments, input device 340 may be configured to receive a location signal from a location system 342. For example, location system 342 may be a GPS location system, a network-based location system, a Wi-Fi-based location system, user input, or other geospatial location systems as known in the art. Input device 340 may then relay the location signal, or transmit a new location signal to server 322. The location signal may include an indication of the geospatial location of input device 340. Server 322 may then compare the geospatial location of input device 340 with locations for one or more of the events in the event list to determine which events are close to input device 340. The determination of whether or not an event location is close to input device 340 may be based on a threshold distance that is either predetermined, configured based on the type of event or user preferences, or set by user input. In some embodiments, the system may learn based on historical information provided by the user which events the user would most like to attend, and set a broader distance threshold to determine if the input device 340 is close to that event. For example, the user may set a range of distance thresholds between 1 mile and 100 miles, and for events that the user likes, the threshold distance value may be near the upper end of the range, and for events in which the user has less interest, the threshold distance value may be near the lower end of the threshold.

In some embodiments, the server may generate an event alert and transmit the event alert to the input device 340 if input device 340 comes within a threshold distance of one or more events. The event alert may be displayed in a ticker on the input device display. In some examples, the user may then interact with the event alert. For example, the event alert may interface with event ticketing system 314 via an API to provide an indication as to whether tickets are available to the event. That indication may be displayed in the event alert on the ticker. The user may then be able to select an option to purchase one or more tickets to the event. The electronic version of the tickets may then be transmitted to server 322 and stored in data store 326, or directly to input device 340 and stored in cache 332. The user may then be able to select and display the electronic tickets from the ticker interface.

In some examples, the ticker interface may also allow a user to select, download, and install mobile device apps related to a particular ticker. For example, the ticket purchasing API may be provided in the form of a ticker-based app and provided by the event ticketing system, e.g., STUBHUB, TICKETMASTER, FANDANGO, or other ticketing system. In this way, a particular ticker may interface with event ticketing system 314 using a proprietary or native API. The same ticker app installation model may be applied to other types of ticker apps, such that individual Internet data sources may provide native ticker-apps that plug into server 322 for a more native user experience with respect to that particular Internet data source ticker.

In some embodiments, an event alert in a ticker display may also provide the user with additional information about the particular event, including parking information, event reviews, seating chart displays, historical information about a sports team, statistics, standings, scores from related games, or other related information as known in the art.

Figure 4:
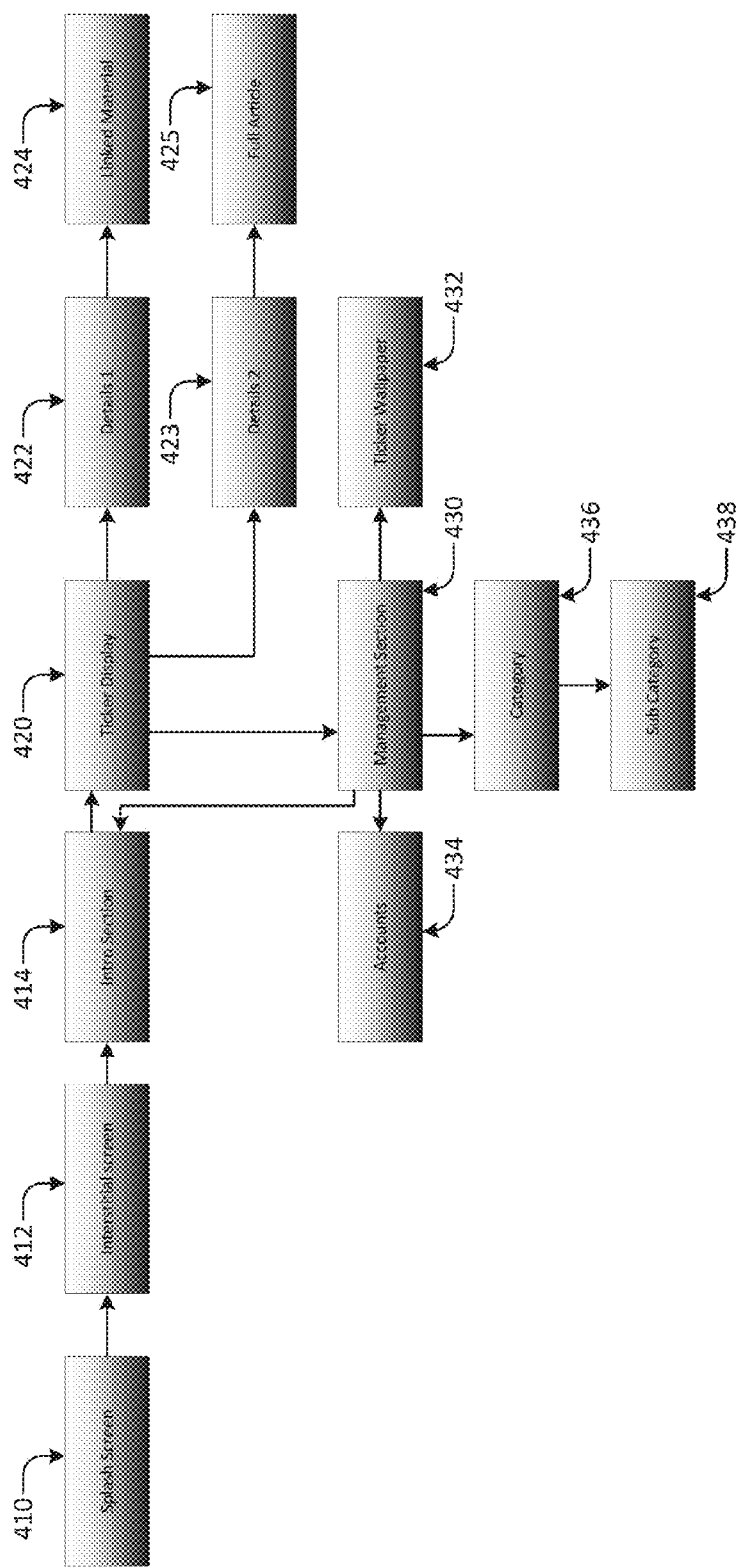
FIG. 4 illustrates a system for displaying parallel data streams in accordance with embodiments of the technology described herein.

FIG. 4 illustrates an example system for displaying parallel data streams. In some examples, a system for displaying parallel data streams may include a computer processor with a computer program embedded thereon, the computer program configured to run a splash screen routine, a ticker display routine 420, and a management routine 430. When interacted with, splash screen routine 410 may progress to an interstitial screen routine 412, an intro screen routine 414, and to ticker display routine 420. Ticker display routine 420 may display one or more tickers and allow user interaction with the tickers. For example, each ticker display routine 420 may be independently selected to rewind, fast forward, or pause the data stream display, and/or to open a detail window display 422 and/or 423 with linked material 424 from an original data source. Users may configure ticker parameters and create links to particular desired Internet data sources using management routine 430.

Figure 5A:
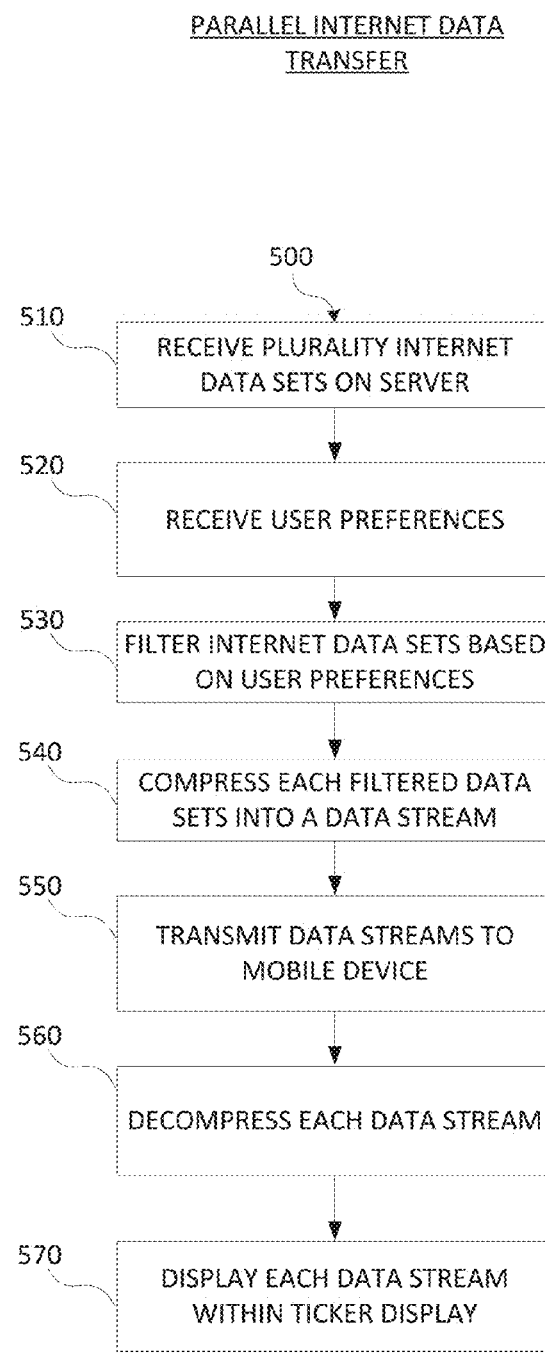
FIG. 5A illustrates a method for highly efficient parallel data transfer in accordance with embodiments of the technology described herein.

FIG. 5A illustrates an example method for highly efficient parallel data transfer 500. An example method includes receiving a plurality of Internet data sets on a server at step 510, receiving user preferences at step 520, and filtering each of the Internet data sets based on user preferences at step 530. For example, the Internet data sets may include RSS, HTTP, SMTP, FTP, XML, or other available Internet data formats from data sources such as news websites, social media websites, or advertising data. The user preferences may be compiled from a user login to an account hosted by the server, or input into a mobile device and transmitted to the server at step 520. The filtering of the Internet data sets at step 530 may invoke static filtering criteria as input by a user, or dynamic criteria based on popularity of each data feed, relevance to a particular user (e.g. because the user frequently visits the data source web site, has members of a social media network related to the story, has a social media profile that is relevant to the story, and/or other available user profile data).

Still referring to FIG. 5A, the method for parallel Internet data transfer 500 may further include compressing each filtered data set into a data stream at step 540, transmitting the data stream to a mobile device at step 550, decompressing the data stream at step 560, and displaying each data stream in an independent interactive ticker display at step 570.

Figure 5B:
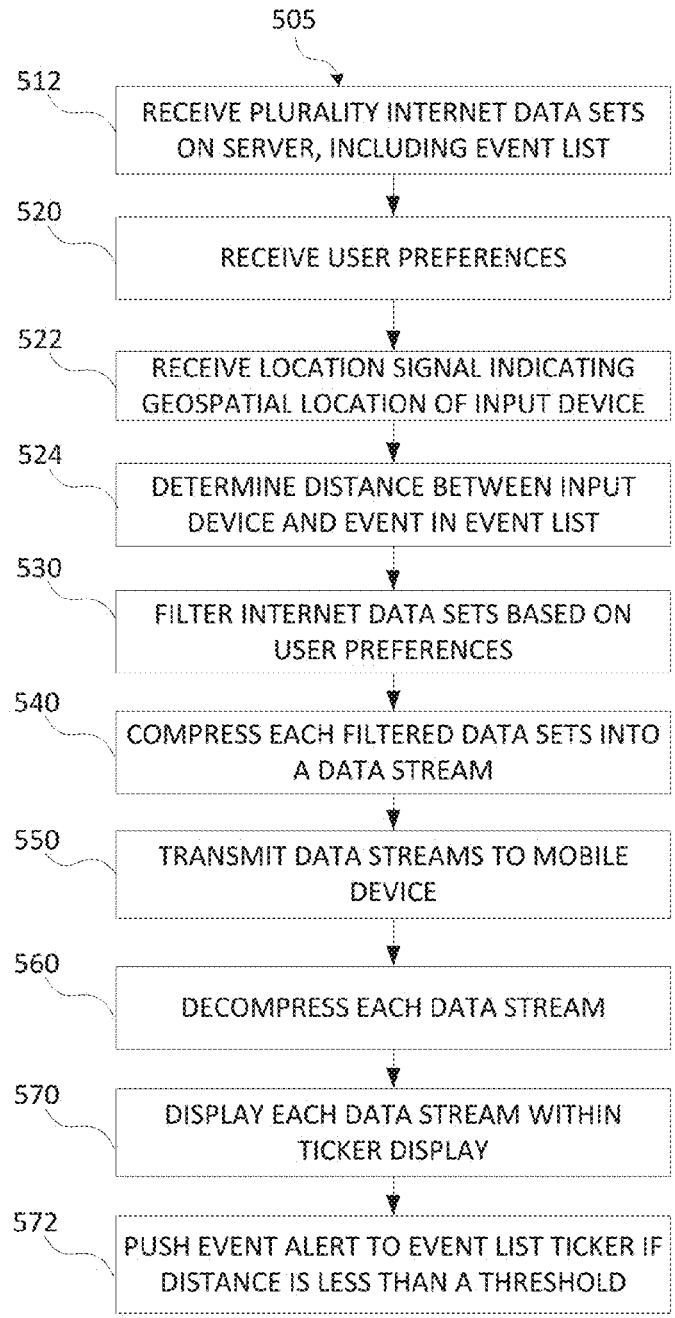
FIG. 5B illustrates a method for highly efficient parallel data transfer with event alerting in accordance with embodiments of the technology described herein.

FIG. 5B illustrates a method for highly efficient parallel data transfer with event alerting. As illustrated in FIG. 5B, the method includes receiving a plurality of Internet data sets on a server at step 512, wherein one or more of the Internet data sets includes an event list, e.g., the event list described herein with respect to FIG. 3B. The method may also include receiving user preferences at step 520, and receiving a location signal at step 522. For example, the location signal may indicate the geospatial location of an input device, such as a smart phone, tablet, laptop, or other device as known in the art. The location signal may be a GPS location signal, a network-based location signal, a Wi-Fi based location signal, or other location signals as known in the art. The method may then include determining a distance between the input device and the physical event at step 524. Steps 530 through 570 may be similar to the steps described herein with respect to a method for parallel internet data transfer described with respect to FIG. 5A. The method may then include pushing an event alert to an event list ticker on the input device if the distance is less than a threshold value.

Figure 5C:
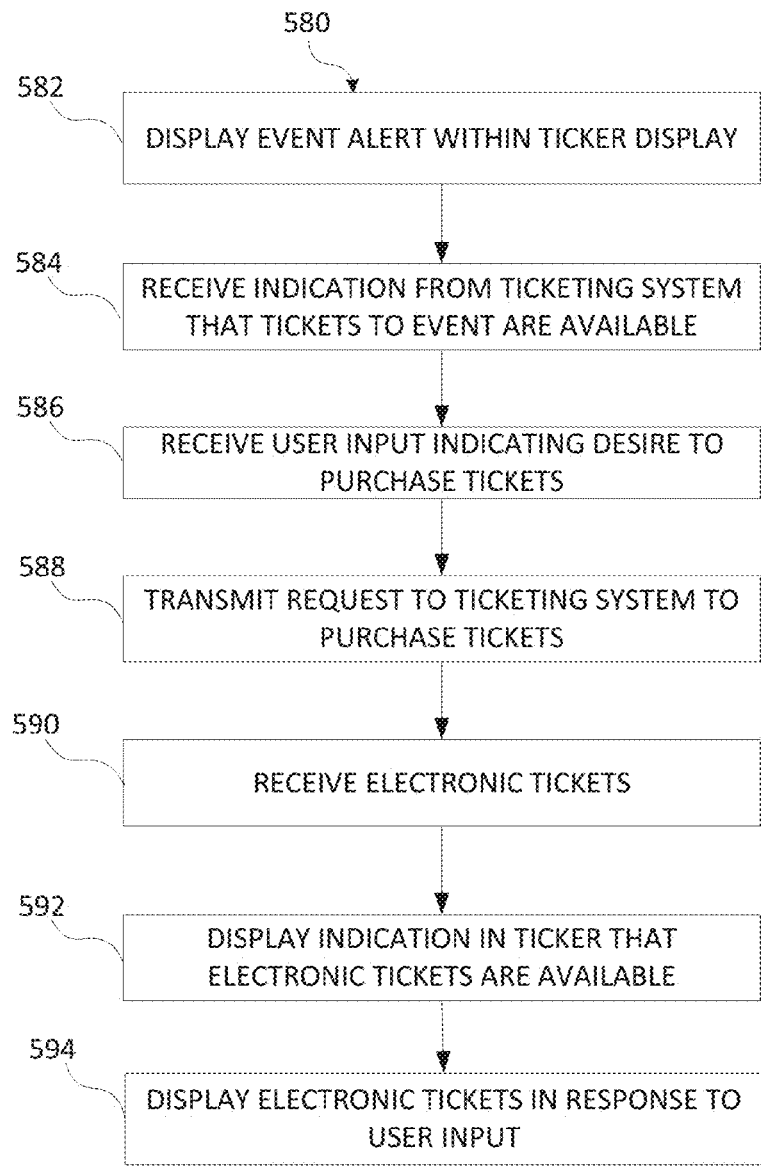
FIG. 5C illustrates a method for event alerting and ticket purchasing in accordance with embodiments of the technology described herein.

FIG. 5C illustrates a method for event alerting and ticket purchasing. For example, the event alert described herein with respect to FIG. 5B may be displayed in a ticker display at step 582. The server may then receive an indication from a ticketing system as to whether tickets to the event are available at step 584. The indication that tickets are available may also be displayed with respect to the event alert in the ticker display. In some embodiments, a user may search for and/or identify events for which the user would like to purchase tickets without having first received an alert. The query may be done to pull event information from an event list, instead of waiting for the information to be pushed in the form of an alert. In some embodiments, the event list may include retail store information, and instead of purchasing tickets, the user may be alerted to or query for particular products for purchase.

The input device may receive user input indicating a desire to purchase tickets to the event at step 586. A request to purchase tickets to the event may be transmitted to the ticketing system at step 588. The method may also include receiving electronic tickets at step 590 and displaying an indication in the ticker display that the electronic tickets are available at step 592. In some examples, the method may include displaying the electronic tickets in response to user input at step 594. Other interactive options may be provided with respect to the event ticker display, e.g., by providing information about the event, an event map, a seating chart, parking, additional event alerts about changes in scores or starting times, links to social media feeds, discussions, or chats relating to the event, or other event-related information as known in the art.

Figure 6:
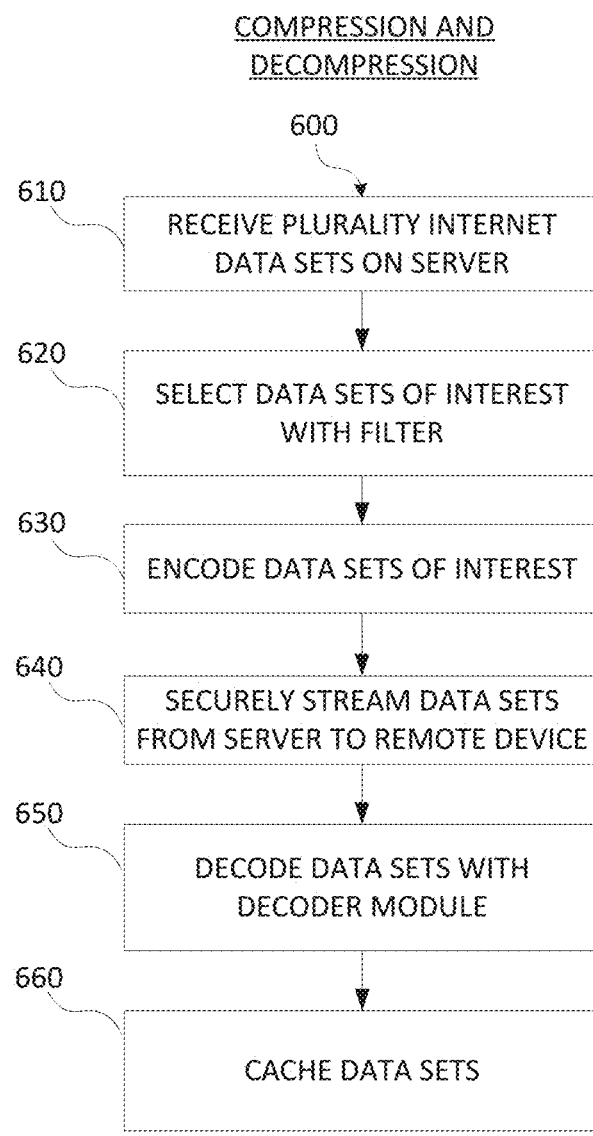
FIG. 6 illustrates data compression and decompression methods in accordance with embodiments of the technology described herein.

FIG. 6 illustrates an example data compression and decompression method. Referring to FIG. 6, a data compression method includes receiving a plurality of data sets, from Internet-based data sources, on a server at step 610, selecting data sets of interest with a filter 620, and encoding the data sets of interest at step 630. The encoded data sets may then be securely streamed to a remote device at step 640. Remote device 640 may be a smart phone, a tablet computer, a personal computer, a smart television, a big screen or oversized display, a car's dashboard display, or other computing device coupled with a display and input device as known in the art. The encoded data may be streamed to the remote device using a secure streaming protocol such as SRTP, or other secure data streaming protocols as known in the art. A method for decompressing data on a remote device may include decoding data sets with a decoder module at step 650 and caching the decoded data sets at step 660.

Figure 7:
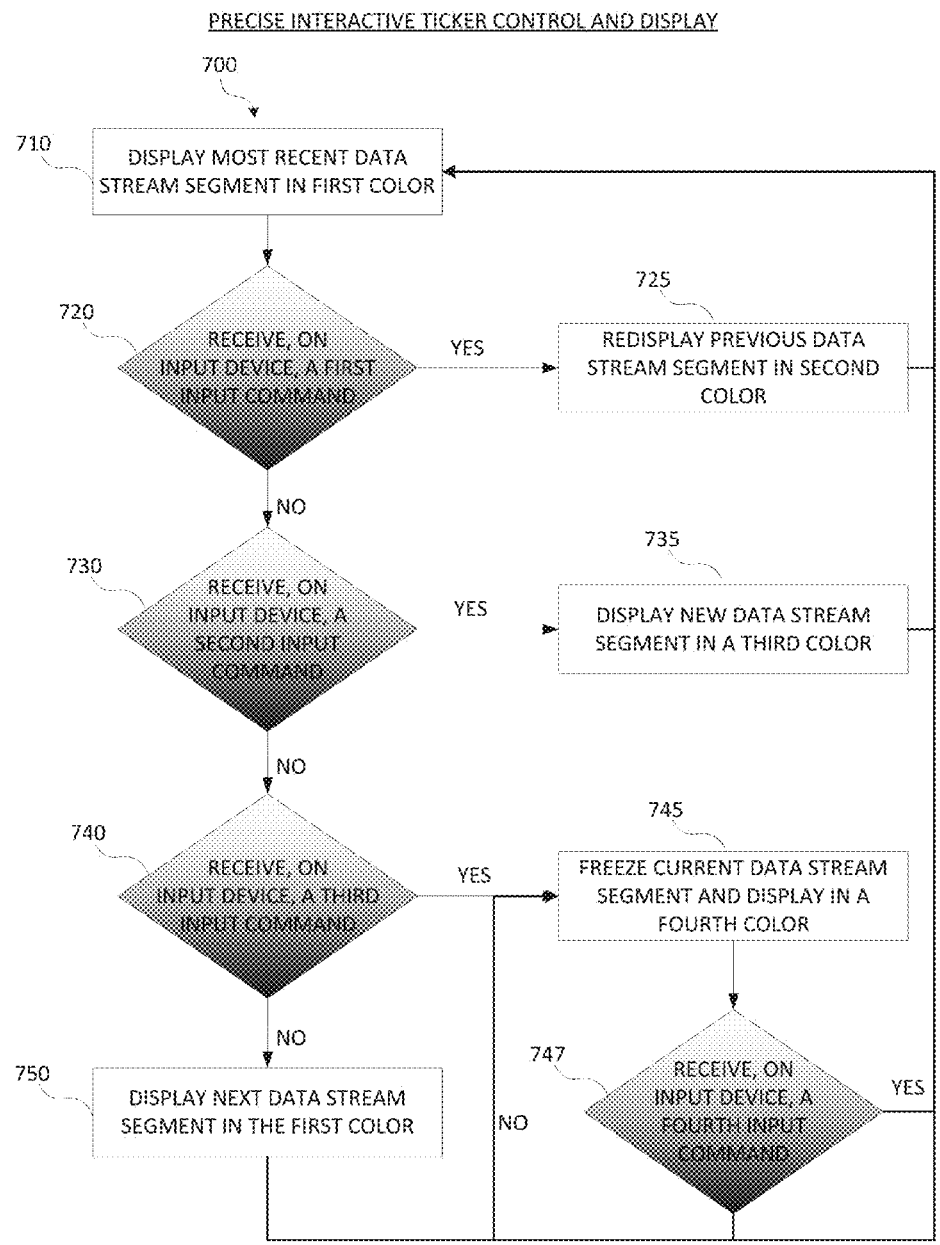
FIG. 7 illustrates methods for precise interactive ticker control and display in accordance with embodiments of the technology described herein.

FIG. 7 illustrates an example method for precise interactive ticker control and display. Referring to FIG. 7, the method may include displaying a most recent data stream segment in a first color within a ticker on a remote device display at step 710 and determining whether a first input command is received on an input device at step 720. For example, the data stream may be a text-based representation of one of the Internet data sets, as disclosed with respect to FIG. 5, and the data stream segment may include enough text characters to stretch across the graphical display device within a ticker display. The first color may be white, or any other color or color shade as known in the art. The input device may be a touch screen, a voice recognition device, a motion detecting device (e.g. a motion detecting wand device), or other input device as known in the art. The first input command may be a swipe gesture on a touch screen device. For example, a user may make a swipe gesture from right to left within the ticker, right over the streaming data segment. In other embodiments, a user may issue a first voice command, such as "slashback" or "rewind." In other embodiments, a user may swipe a motion sensing device from right to left. Other commands, as input into a variety of input devices, may be used as would be known in the art.

Still referring to FIG. 7, the method for precise interactive ticker control and display may further include redisplaying a previous data stream segment at step 725 if the first input command is received by the input device. For example, the previous data stream segment may be a data stream segment from just seconds earlier, from minutes earlier, or hours earlier as determined by user configuration settings. The previous data stream segment may be displayed in a second color or shade.

The method for precise interactive ticker control and display may further include determining whether a second input command is received on an input device at step 730. For example, a user may make a swipe gesture from left to right within the ticker, right over the streaming data segment. In other embodiments, a user may issue a second voice command, such as "skip ahead" or "fast forward." In other embodiments, a user may swipe a motion sensing device from left to right. Other commands, as input into a variety of input devices, may be used as would be known in the art.

Still referring to FIG. 7, the method may further include displaying a new data stream segment if the second input command is received by the input device at step 735. For example, the new data stream segment may be a data stream segment seconds ahead of the current segment, minutes ahead of the current segment, or hours ahead of the current segment as determined by user configuration settings. The new data stream segment may be displayed in a third color or shade.

The method for precise interactive ticker control and display may further include determining whether a third input command is received on an input device at step 740. For example, a user may make a tapping gesture within the ticker, right over the streaming data segment. In other embodiments, a user may issue a third voice command, such as "pause" or "freeze." In other embodiments, a user may a predetermined gesture on a motion sensing device. Other commands, as input into a variety of input devices, may be used as would be known in the art.

Still referring to FIG. 7, the method may further include freezing the current data stream segment in place at step 745 if the third input command is received by the input device. For example, the frozen data stream segment may be displayed within the ticker until a subsequent user input command is received. The frozen data stream segment may be displayed in a fourth color or shade.

The method for precise interactive ticker control and display may further include determining whether a fourth input command is received on an input device at step 747, the fourth input command only being applicable if received immediately subsequent to the third input command. For example, a user may make a subsequent tapping gesture within the ticker, right over the frozen data segment. In other embodiments, a user may issue a fourth voice command, such as "play" or "go." In other embodiments, a user may a predetermined gesture on a motion sensing device. Other commands, as input into a variety of input devices, may be used as would be known in the art.

Still referring to FIG. 7, the method may further include advancing the current data stream segment to an immediately subsequent data stream segment at step 750. The method may also include advancing the current data stream segment to the immediately subsequent data stream segment if a fourth input command is received by the input device immediately subsequent to having received the third input command. The method may also include advancing the current data stream segment to the immediately subsequent data stream segment after redisplaying the previous data stream segment at step 725 or after displaying the new data stream segment at step 735.

Figure 8:
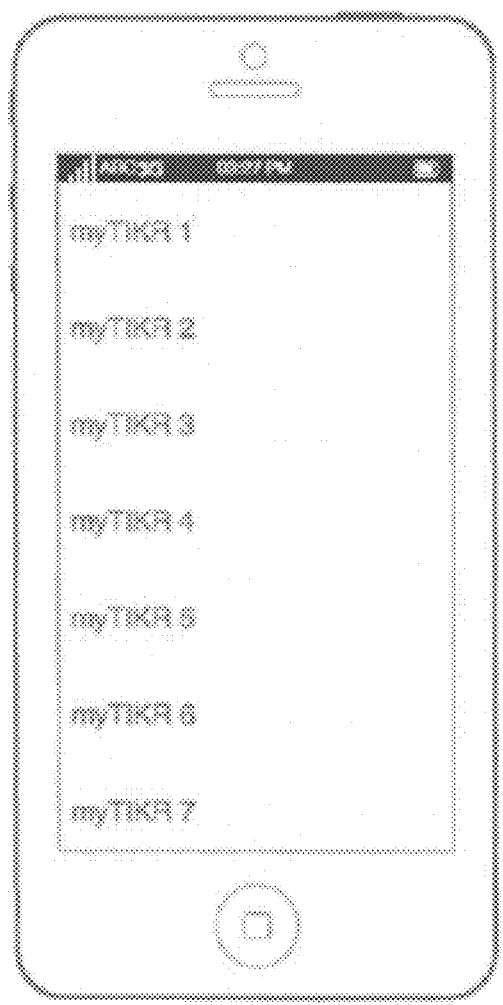
FIG. 8 illustrates an user interaction with parallel data stream display in accordance with embodiments of the technology described herein.
Figure 8:
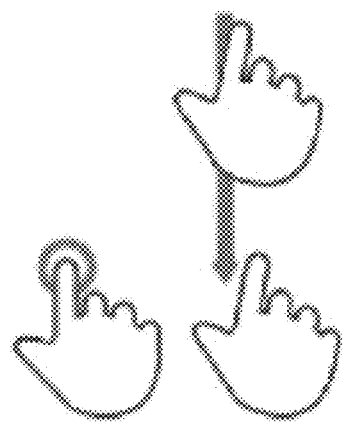

FIG. 8 illustrates an example method of interacting with a parallel data stream display. Referring to FIG. 8, a plurality of tickers may be displayed on a graphical user interface. Each ticker may display an independent data stream from a disparate Internet data source. The display may enable a user to interact individually with each ticker using standard mobile device operating system commands, such as through gesture commands on a touch screen. In addition, to the extent that the list of tickers does not fit within the window frame, a user may use swipe gestures to scroll the list of ticker displays up or down.

Figure 9:
FIG. 9 illustrates an user interaction with a parallel data stream display in accordance with embodiments of the technology described herein.

FIG. 9 illustrates another example method of interacting with a parallel data stream display. Referring to FIG. 9, individual tickers may be rearranged using a touch, hold, and swipe gesture sequence as shown. For example, the user interactions in FIG. 9 may be enabled using a touch screen input device, a voice recognition input device, a motion detecting input device, or other input devices as known in the art.

Figure 10:
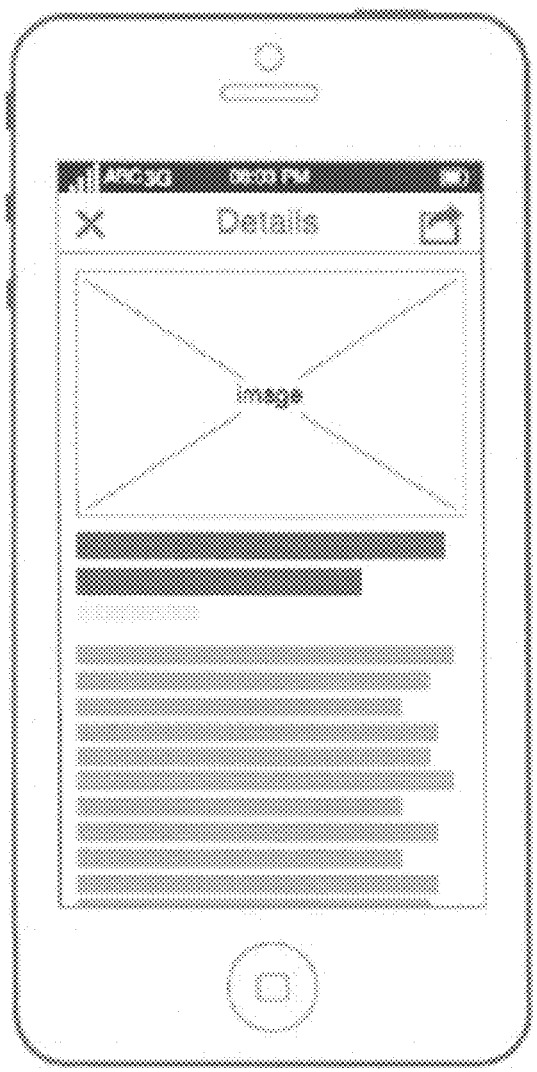
FIG. 10 illustrates an user interaction with a data stream detail display from a parallel data stream display system in accordance with embodiments of the technology described herein.
Figure 10:
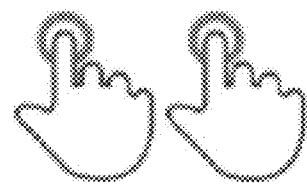

FIG. 10 illustrates an example interaction with a parallel data stream display wherein a detail window frame can be opened by selecting an individual ticker. The detail window frame may include data from the original Internet data source associated with the ticker. For example, the detail window frame may display a complete or mobile version of a particular website. For example, the user interactions in FIG. 10 may be enabled using a touch screen input device, a voice recognition input device, a motion detecting input device, or other input devices as known in the art.

Figure 11:
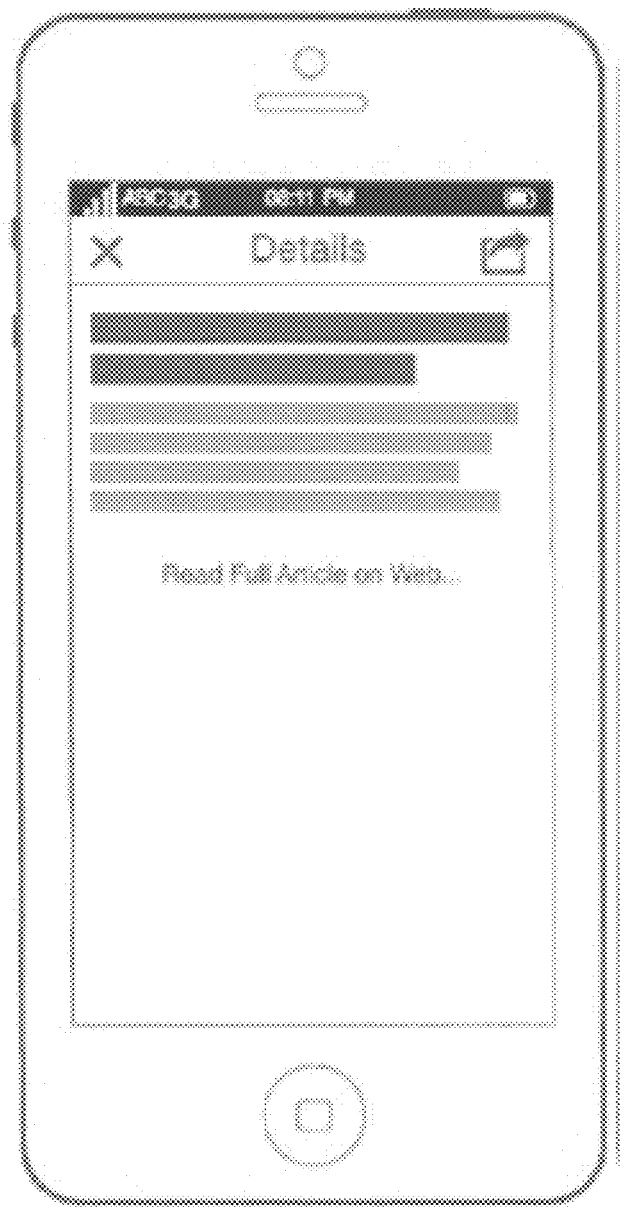
FIG. 11 illustrates a data stream detail display from a parallel data stream display system in accordance with embodiments of the technology described herein.

Similarly, FIG. 11 illustrates another example interaction with a parallel data stream display wherein a detail window frame can be opened by selecting an individual ticker. Referring to FIG. 11, a detail window frame may display summary data and enable a user interaction to display further detail from the Internet data source. For example, the user interactions in FIG. 11 may be enabled using a touch screen input device, a voice recognition input device, a motion detecting input device, or other input devices as known in the art.

Figure 12:
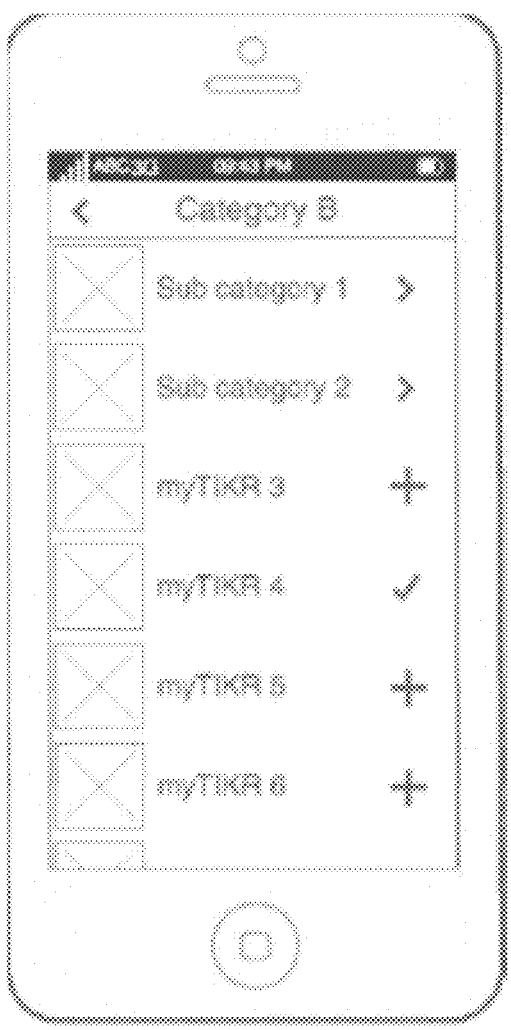
FIG. 12 illustrates configuration display from a parallel data stream display system in accordance with embodiments of the technology described herein.

FIG. 12 illustrates an example of a configuration display window from a parallel data stream display system. Referring to FIG. 12, a configuration display window may enable user interaction to configure and categorize tickers. For example, all social media tickers may be placed into a particular category, enabling a user to select the social media category before being presented with the list of social media tickers. For example, the user interactions in FIG. 12 may be enabled using a touch screen input device, a voice recognition input device, a motion detecting input device, or other input devices as known in the art.

Figure 13:
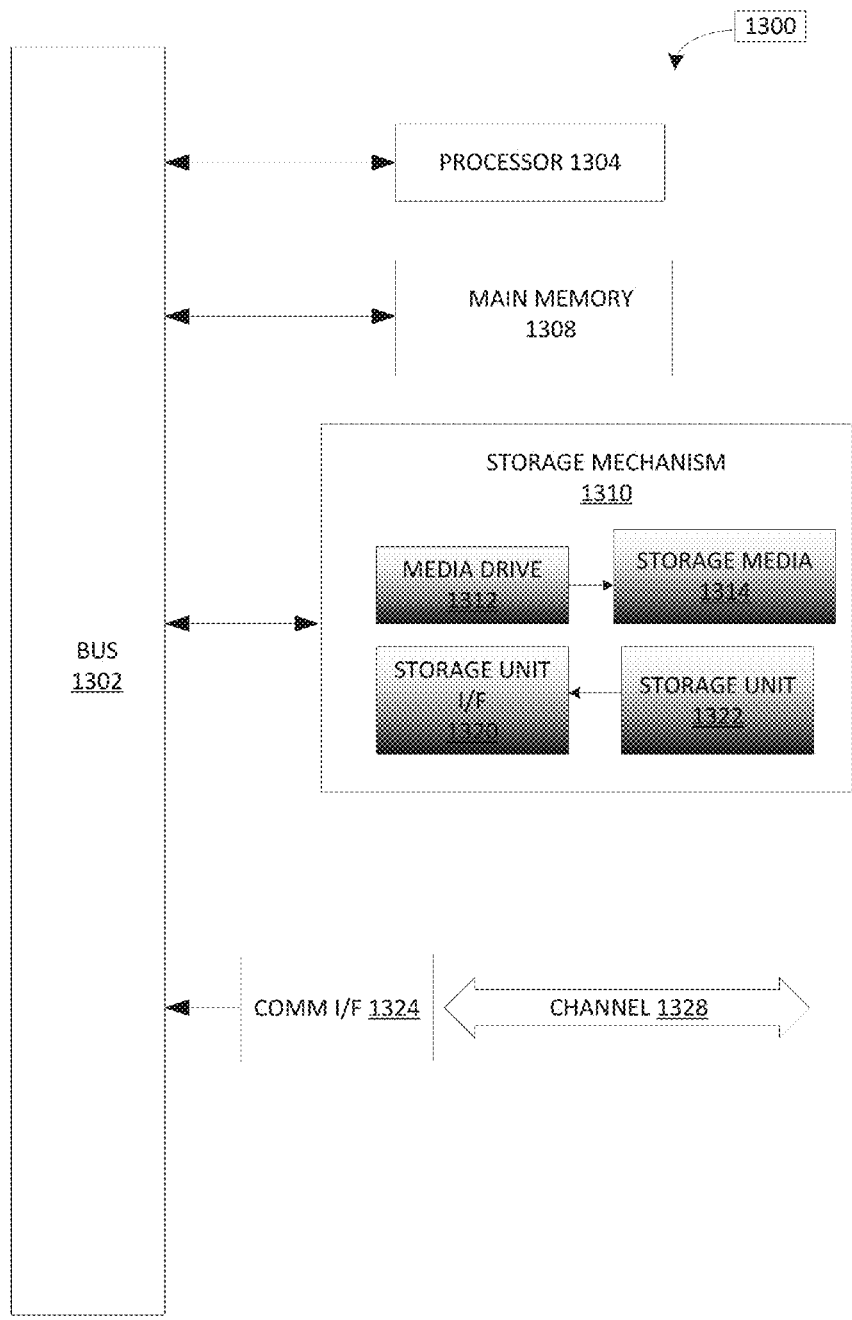
FIG. 13 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example computing module 1300. After reading this description, it will become apparent to a person skilled in the relevant art how to implement the technology using other computing modules or architectures.

Referring now to FIG. 13, computing module 1300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1300 might include, for example, one or more processors, controllers, control modules, or other processing devices, such as a processor 1304. Processor 1304 might be implemented using a general-purpose or special-purpose processing engine such as, for example, a microprocessor, controller, or other control logic. In the illustrated example, processor 1304 is connected to a bus 1302, although any communication medium can be used to facilitate interaction with other components of computing module 1300 or to communicate externally.

Computing module 1300 might also include one or more memory modules, simply referred to herein as memory 1308. For example, preferably Random Access Memory (RAM) or other dynamic memory, might be used for storing information and instructions to be executed by processor 1304. Memory 1308 might also be used for storing temporary variables or other intermediate information during execution of instructions to be executed by processor 1304. Computing module 1300 might likewise include a read only memory ("ROM") or other static storage device coupled to bus 1302 for storing static information and instructions for processor 1304.

The computing module 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a floppy disk drive, a magnetic tape drive, an optical disk drive, a CD or DVD drive (R or RW), or other removable or fixed media drive might be provided. Accordingly, removable storage media 1314 might include, for example, a hard disk, a floppy disk, magnetic tape, cartridge, optical disk, a CD or DVD, or other fixed or removable medium that is read by, written to or accessed by media drive 1312. As these examples illustrate, the removable storage media 1314 can include a computer usable storage medium having stored therein computer software or data.

In alternative embodiments, information storage mechanism 1310 might include other similar instrumentalities for allowing computer programs or other instructions or data to be loaded into computing module 1300. Such instrumentalities might include, for example, a fixed or removable storage unit 1322 and a storage unit interface 1320. Examples of such removable storage units 1322 and storage unit interfaces 1320 can include a program cartridge and cartridge interface, a removable memory (for example, a flash memory or other removable memory module) and memory slot, a PCMCIA slot and card, and other fixed or removable storage units 1322 and storage unit interfaces 1320 that allow software and data to be transferred from the removable storage unit 1322 to computing module 1300.

Computing module 1300 might also include a communications interface 1324. Communications interface 1324 might be used to allow software and data to be transferred between computing module 1300 and external devices. Examples of communications interface 1324 might include a modem or softmodem, a network interface (such as an Ethernet, network interface card, WiMedia, IEEE 802.XX or other interface), a communications port (such as for example, a Universal Serial Bus (USB) port, Infrared (IR) port, RS232 port Bluetooth® interface, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, a Radio Frequency (RF) link, an optical link, a network interface, a local or wide area network, and other wired or wireless communications channels.

In this document, the terms "computer program medium" and "computer usable medium" are used to generally refer to media such as, for example, memory 1308, storage unit interface 1320, storage media 1314, and channel 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1300 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for interactive event notification comprising:
receiving, with an aggregation server, a plurality of Internet data feeds, wherein one of the plurality of Internet data feeds comprises an event list, the event list comprising a plurality of events and a plurality of event locations, wherein each event location corresponds to one of the plurality of events;
receiving, with the aggregation server, a set of user preferences;
receiving a location signal from an input device, the location signal comprising an indication of a current input device location;
determining a distance between the current input device location and an event location from the plurality of event locations;
filtering, with a computer processor, each Internet data feed according to the set of user preferences;
streaming each internet data feed to a remote computing device as one of a plurality of data segments, wherein one of the plurality of data segments is an event list data segment for displaying one or more events from the plurality of events;
displaying each data segment in an interactive stacked ticker display on the input device;
pushing to the event list data segment an event alert if the distance is less than a threshold value;
enabling one or more user interactions through the input device; and
sending a request to an event ticketing system to purchase one or more event tickets after receiving an indication that one or more event tickets corresponding to the event alert are available for purchase, if a first input command is received.

2. The method of claim 1, further comprising redisplaying a previous data segment if a second input command is received, displaying a new data segment if a third input command is received, and freezing a current data segment within the interactive stacked ticker display if a fourth input command is received.

3. The method of claim 1, wherein the plurality of events comprises a baseball game, a hockey game, a football game, a concert, a theatric production, a movie, a tennis match, a golf tournament, or a basketball game.

4. The method of claim 1, wherein the location signal comprises a GPS signal, a network-based location signal, or a Wi-Fi based location signal.

5. The method of claim 1, wherein the one or more user interactions comprise gesture-based interactions and the input device comprises a touch screen display.

6. The method of claim 1, further comprising:
compressing, with a computer processor located on the aggregation server, one or more of the Internet data feeds; and
decompressing, with a computer processor located on the remote computing device, the Internet data feeds.

7. The method of claim 1, wherein the streaming is performed using SRTP.

8. The method of claim 1, further comprising:
redisplaying a previous data segment if a first input command is received; and
displaying a new data segment if a second input command is received.

9. An interactive event notification system comprising:
an Internet data stream consolidation engine and a remote processing engine;
wherein the Internet data stream consolidation engine comprises a processor and a non-transitory computer readable medium with computer executable instructions embedded thereon, the computer executable instructions to cause the processor to:

receive a plurality of Internet data feeds, a set of user preferences, and a location signal indicating a current remote processing engine location;

filter each Internet data feed according to the set of user preferences, and stream the Internet data feed to the remote processing device as a data segment, wherein the Internet data feed comprises a plurality of events and a plurality of event locations, wherein each event location corresponds to one of the plurality of events; and determine a distance between the current remote processing engine location and an event location from the plurality of event locations; and the remote processing module comprises a receiver, an input device, and a display, wherein the receiver is configured to;

receive the data segment; and if the distance is less than a threshold value, push to the display an event alert;

the display is configured to display the data segment and the event alert within a stacked ticker display; and the input device is configured to enable user interactions with the stacked ticker display;

wherein the computer readable instructions further cause the processor to send a request to an event ticketing system to purchase one or more event tickets after receiving the indication that one or more event tickets corresponding to the event alert are available for purchase, if a first input command is received.

10. The system of claim 9, wherein the plurality of events comprises a baseball game, a hockey game, a football game, a concert, a theatric production, a movie, a tennis match, a golf tournament, or a basketball game.

11. The system of claim 9, wherein the location signal comprises a GPS signal, a network-based location signal, or a Wi-Fi based location signal.

12. The system of claim 9, wherein the user interactions comprise gesture-based interactions and the input device comprises a touch screen display.

13. The system of claim 9, wherein the user interactions comprise voice commands and the input device comprises a voice recognition device.

14. The system of claim 9, wherein the user interactions comprise gesture-based interactions and the input device comprises a motion detection device.

15. The system of claim 9, wherein the remote processing engine is located on a smart phone with a touch screen display.

16. The system of claim 9, wherein the remote processing engine comprises a cache and a display controller;

wherein the cache is configured to receive the data segment from a streaming engine; and the display controller is configured to display the data segment in an interactive ticker display.

\* \* \* \* \*